No. 834,061. PATENTED OCT. 23, 1906.
E. C. KAHN.
HYDROCARBON BURNER.
APPLICATION FILED FEB. 28, 1906.
2 SHEETS—SHEET 1.
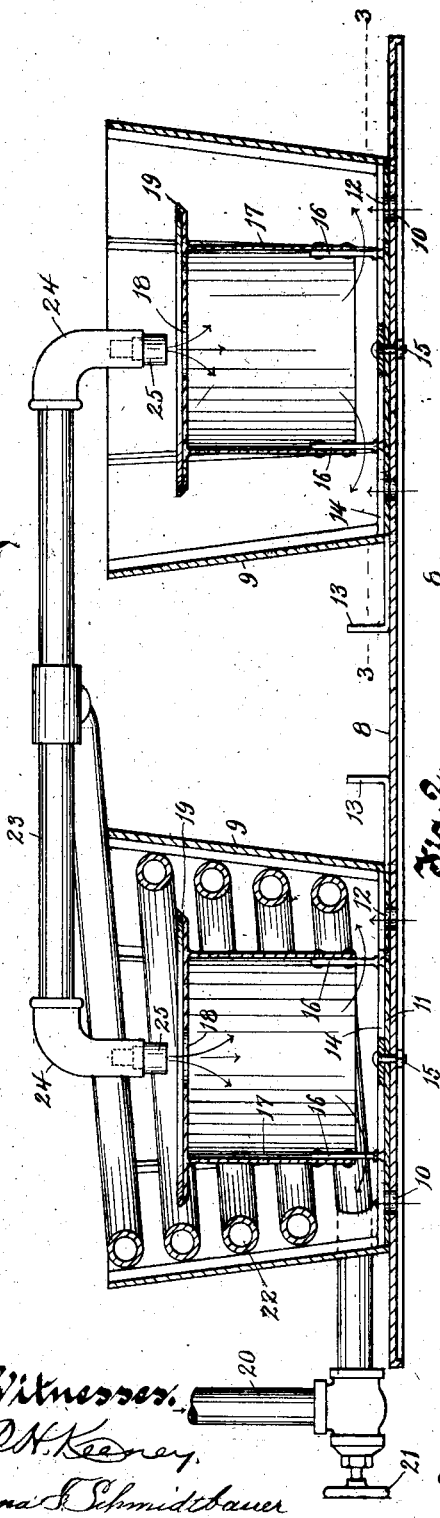
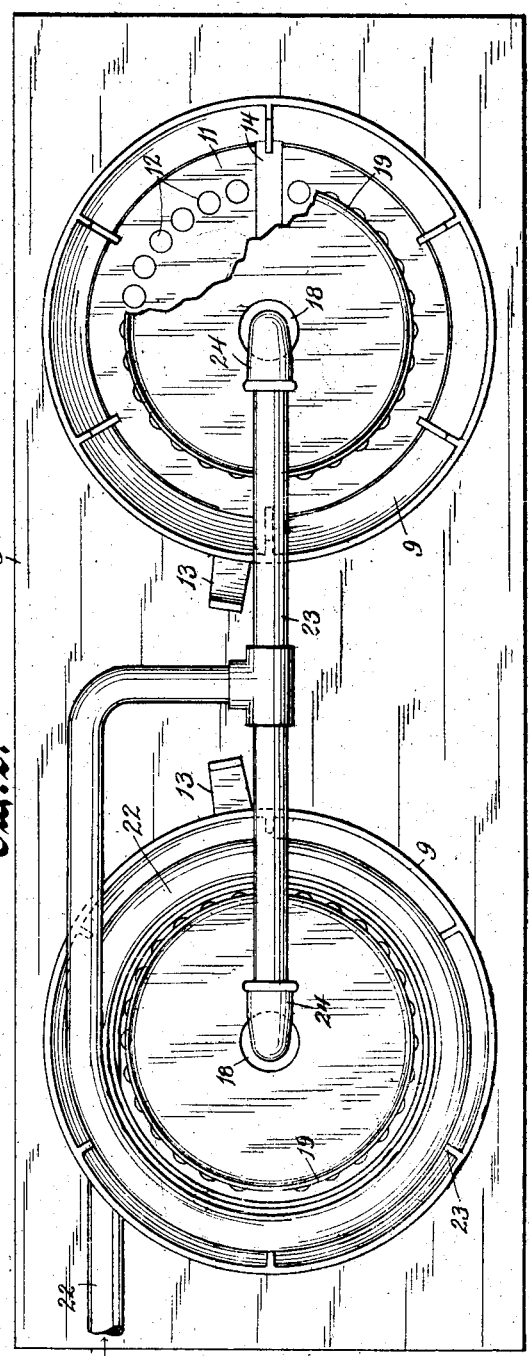
Witnesses:
C. H. Keeney,
Anna F. Schmidtbauer.
Inventor:
Edward C. Kahn,
By Benedict, Morsell & Caldwell,
Attorneys.

No. 834,061. PATENTED OCT. 23, 1906.
E. C. KAHN.
HYDROCARBON BURNER.
APPLICATION FILED FEB. 28, 1906.
2 SHEETS—SHEET 2.
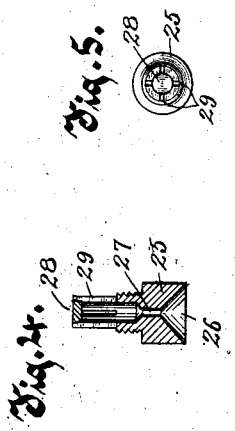
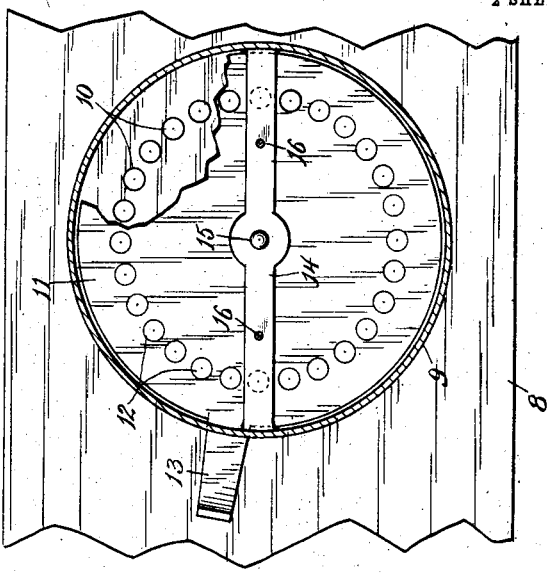
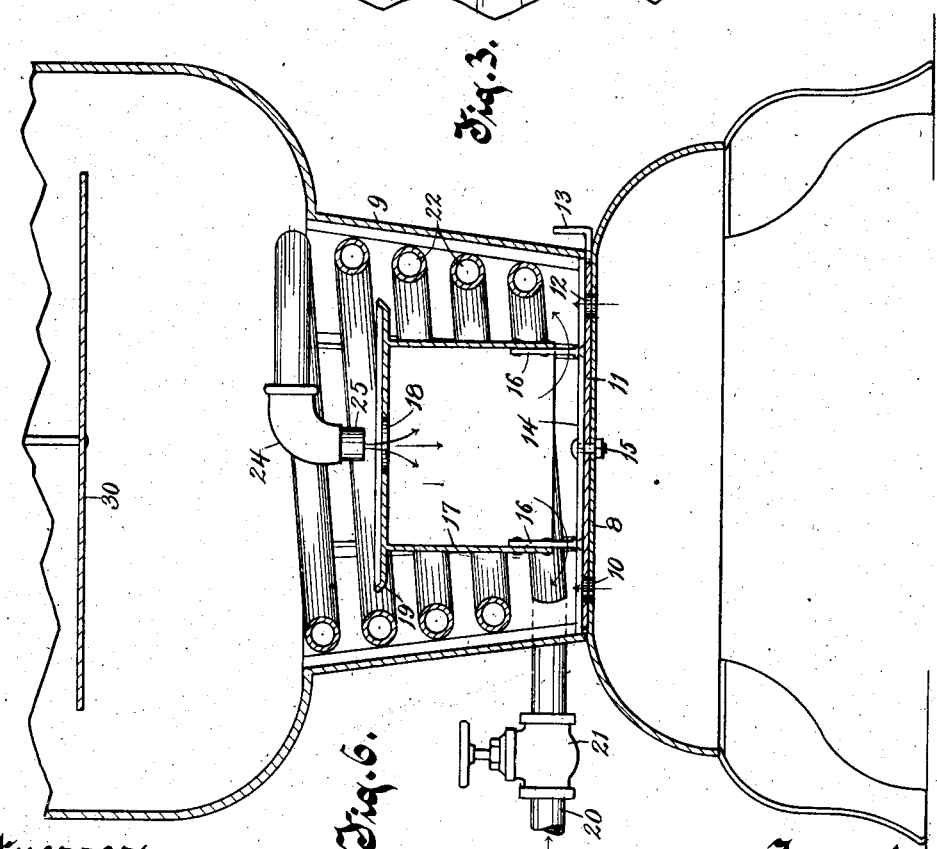
Witnesses.
Inventor.
Edward C. Kahn,
By Benedict, Morsell & Caldwell
Attorneys

UNITED STATES PATENT OFFICE.

EDWARD C. KAHN, OF MILWAUKEE, WISCONSIN.

HYDROCARBON-BURNER.

No. 834,061.　　　　　Specification of Letters Patent.　　　　Patented Oct. 23, 1906.

Application filed February 28, 1906. Serial No. 303,337.

*To all whom it may concern:*

Be it known that I, EDWARD C. KAHN, residing in Milwaukee, in the county of Milwaukee and State of Wisconsin, have invented new and useful Improvements in Hydrocarbon-Burners, of which the following is a description, reference being had to the accompanying drawings, which are a part of this specification.

This invention relates to hydrocarbon-burners, and especially to burners adapted for burning the cheaper grades of kerosene-oil and the like.

The invention has for its object to improve upon existing burners of this nature and provide a structure which will be strong and durable and highly efficient in its operation.

With the above and other objects in view the invention consists in the devices herein described and claimed, their parts and combinations of parts, and all equivalents.

Referring to the accompanying drawings, in which like characters of reference indicate the same parts in the several views, Figure 1 is a longitudinal sectional view of the preferred embodiment of this invention for use in ranges or cooking-stoves. Fig. 2 is a plan view thereof, a part being broken away for clearness of illustration. Fig. 3 is a sectional plan view of a portion thereof with a part broken away and taken on the plane of line 3 3 of Fig. 1. Fig. 4 is a central sectional view of the spray-nozzle. Fig. 5 is a plan view thereof, and Fig. 6 is a sectional view of a modified form of the invention as applied to a heating-stove.

In the drawings, 8 represents a base-plate, which is preferably rectangular, as shown, and is capable of being located within the fire-box of a range or cooking-stove by resting upon the grate thereof or on any other desirable support. A pair of shells or casings 9 of the shape of a truncated cone are secured to the base-plate 8 with their smaller ends downward and form combustion-chambers. The base-plate 8 is provided with perforations 10, arranged in a circular series in the bottom of each of the combustion-chambers, and a disk-shaped valve-plate 11 is pivotally mounted on the base-plate in the bottom of each combustion-chamber and has perforations 12, adapted to register more or less with the perforations 10 of said base-plate. A handle 13 of each valve-plate extends through a slot of the casing 9 to afford a means by which the valve-plate may be turned to vary the degree of registration of the perforations. A cross-bar 14 extends across the bottom of each combustion-chamber with its ends secured to the casing 9, and through this cross-bar a bolt 15 passes to constitute the pivotal connection for the valve-plate. Standards 16 extend upwardly from the cross-bar 14 and support a cylindrical casing 17 at some distance above the bottom of the combustion-chamber, said cylindrical casing constituting a mixing-chamber with a closed top except for a central admission-opening 18 and provided with an annular flaring deflecting flange 19 at the upper end.

An oil-supply pipe 20, provided with a controlling-valve 21, conducts oil under pressure from a suitable source of supply, usually an elevated reservoir, and connects with the lower end of a spirally-wound retort-coil 22, which fits within one of the combustion-chambers around the mixing-chamber and against a series of radial spacing-ribs 23 on the casing 9 to hold it out to contact with said casing. The upper end of the retort-coil is connected midway between the two combustion-chambers with the middle of a nozzle-pipe 23, at each end of which is an elbow 24, carrying a spray-nozzle 25, directing its jet of gas downwardly through the opening 18 in the top of the mixing-chamber therebeneath.

The nozzle 25, as shown in Figs. 4 and 5, has a flaring mouth 26, supplied by a very restricted orifice 27 from a threaded tubular stem, which is plugged at its end by means of a stopper 28 and has a series of radial slots 29, through which it communicates with the interior of the conductor leading thereto.

In operation the oil within the retort-coil 22 is vaporized by the heat within the combustion-chamber, so that it is discharged as a fine spreading spray of oil-gas by both nozzles 25 through the openings 18 in the tops of the mixing-chambers, carrying air down with it by induction through said openings and becoming thoroughly mixed therewith by the eddying currents within the mixing-chamber. The mixture passes out around the lower edge of the mixing-chamber into the combustion-chamber, where it burns freely with air which it draws from beneath the base-plate through the registering openings 10 and 12. In the upward course of the burning gases they are deflected outwardly and somewhat retarded by the flaring flange 19 of the mixing-chamber, so as to be spread and follow the walls of the combustion-chamber where the retort-coil is located, the flame being free to travel entirely around the convolutions of the coil by reason of the space provided between the coil and the casing 9 by the presence of the radial ribs 23. The amount of air which is admitted to the combustion-chambers may be regulated to suit requirements by turning the valve-plates 11 by means of the projecting handles 13, so as to bring the openings 12 more or less into register with the openings 10. As the retort-coil connects with the nozzle-pipe 23 midway between the burners, the two nozzles will receive the same supply of gas under the same pressure, and consequently the two burners will be equal in their heating effect.

In the modification shown in Fig. 6 the casing 9 of the combustion-chamber is made to constitute the waist of a heating-stove, becoming a portion of the stove-casing proper, and as there is but one burner here present the retort-coil connects directly with the single-nozzle connection 24. Furthermore, the base-plate in this construction is bent downwardly to constitute the base of the stove. Otherwise the construction of the burner is the same as the left-hand burner shown in Fig. 1. In the heating-stove suitable baffle-plates 30 are provided in the body portion of the stove-frame to deflect the heated gases back and forth and extend their path of travel, so as to utilize their heating effect to the greatest extent practicable.

It will be noted that with this invention the course of the oil or gas is constantly upward from the time it enters the retort-coil until it is discharged through the spray-nozzles, which is a necessary feature in order to avoid the slight explosions due to pockets or traps formed in the passage-way.

The flaring shape of the combustion-chamber casing 9 provides for a gradually-enlarging passage between this casing and the cylindrical mixing-chamber to allow for the gradual expansion of the gases during combustion. By adjusting the valve-plates so that the requisite amount of air is admitted for the flow of gas used a blue flame may be produced in the combustion-chamber having an intense heating effect, which will enable the stove to perform the same duties as when coal or other fuel is employed.

What I claim as my invention is—

1. In a hydrocarbon-burner, a conical casing forming a combustion-chamber, a cylindrical casing therein constituting a mixing-chamber with an inlet-opening at its top and an outlet into the combustion-chamber at its bottom, a retort-coil located within the combustion-chamber in the flaring space around the mixing-chamber, a nozzle through which the retort-coil discharges into the inlet-opening of the mixing-chamber, and an annular flange on the casing of the mixing-chamber for deflecting the flame outwardly against the retort-coil.

2. In a hydrocarbon-burner, a conical casing forming a combustion-chamber, a cylindrical casing therein constituting a mixing-chamber with an inlet-opening at its top and an outlet into the combustion-chamber at its bottom, a retort-coil located within the combustion-chamber in the flaring space around the mixing-chamber, radial ribs along the walls of the combustion-chamber casing by means of which the retort-coil is spaced from said walls, a nozzle through which the retort-coil discharges into the inlet-opening of the mixing-chamber, and an annular flange on the casing of the mixing-chamber for deflecting the flame outwardly against the retort-coil.

3. In a hydrocarbon-burner, a casing constituting a combustion-chamber, a base-plate thereon provided with perforations through which air may be admitted to the combustion-chamber, a valve-plate pivotally mounted on the base-plate and provided with perforations to register more or less with the perforations of the base-plate, a casing within the combustion-chamber and constituting a mixing-chamber with an inlet-opening at its upper end and an outlet-opening into the combustion-chamber between its lower edge and the bottom of the combustion-chamber, a retort-coil within the combustion-chamber and surrounding the mixing-chamber, and a nozzle through which the retort-coil discharges into the inlet-opening of the mixing-chamber.

4. In a hydrocarbon-burner, a casing constituting a combustion-chamber, a base-plate thereon provided with perforations through which air may be admitted to the combustion-chamber, a valve-plate pivotally mounted on the base-plate and provided with perforations to register more or less with the perforations of the base-plate, a handle on the valve-plate projecting through the wall of the combustion-chamber by which the valve-plate may be adjusted, a cross-bar extending across the bottom of the combustion-chamber, standards on the cross-bar, a mixing-chamber mounted on the standards at a distance above the bottom of the combustion-chamber to form an outlet-opening between its lower edges and the bottom of the combustion-chamber, said mixing-chamber being provided with a cover with an inlet-opening therethrough, a retort-coil within the combustion-chamber and surrounding the mixing-chamber, and a nozzle through which the retort-coil discharges into the inlet-opening of the mixing-chamber.

5. In a hydrocarbon-burner of the multiple type, a base-plate provided with a series of perforations for each burner unit, a conical casing secured to the base-plate and forming a combustion-chamber for each of the burner units, a valve-plate pivotally mounted on the base-plate in the bottom of each combustion-chamber and having perforations to register more or less with the perforations of the base-plate, a cylindrical casing in each combustion-chamber constituting a mixing-chamber with an inlet-opening in its upper end and an outlet-opening formed between its lower edge and the bottom of the combustion-chamber, a retort-coil in one of the combustion-chambers surrounding the mixing-chamber thereof, and a nozzle-pipe having nozzles to discharge into the inlet-openings of the several mixing-chambers, said retort-coil connecting with the nozzle-pipe at a point equidistant from the nozzles.

In testimony whereof I affix my signature in presence of two witnesses.

EDWARD C. KAHN.

Witnesses:
R. S. C. CALDWELL,
ANNA F. SCHMIDTBAUER.